INVENTOR.
RONALD J. DUSWALT
BY R.H. Henderson
ATTORNEY

INVENTOR.
RONALD J. DUSWALT
BY R.H.Henderson
ATTORNEY

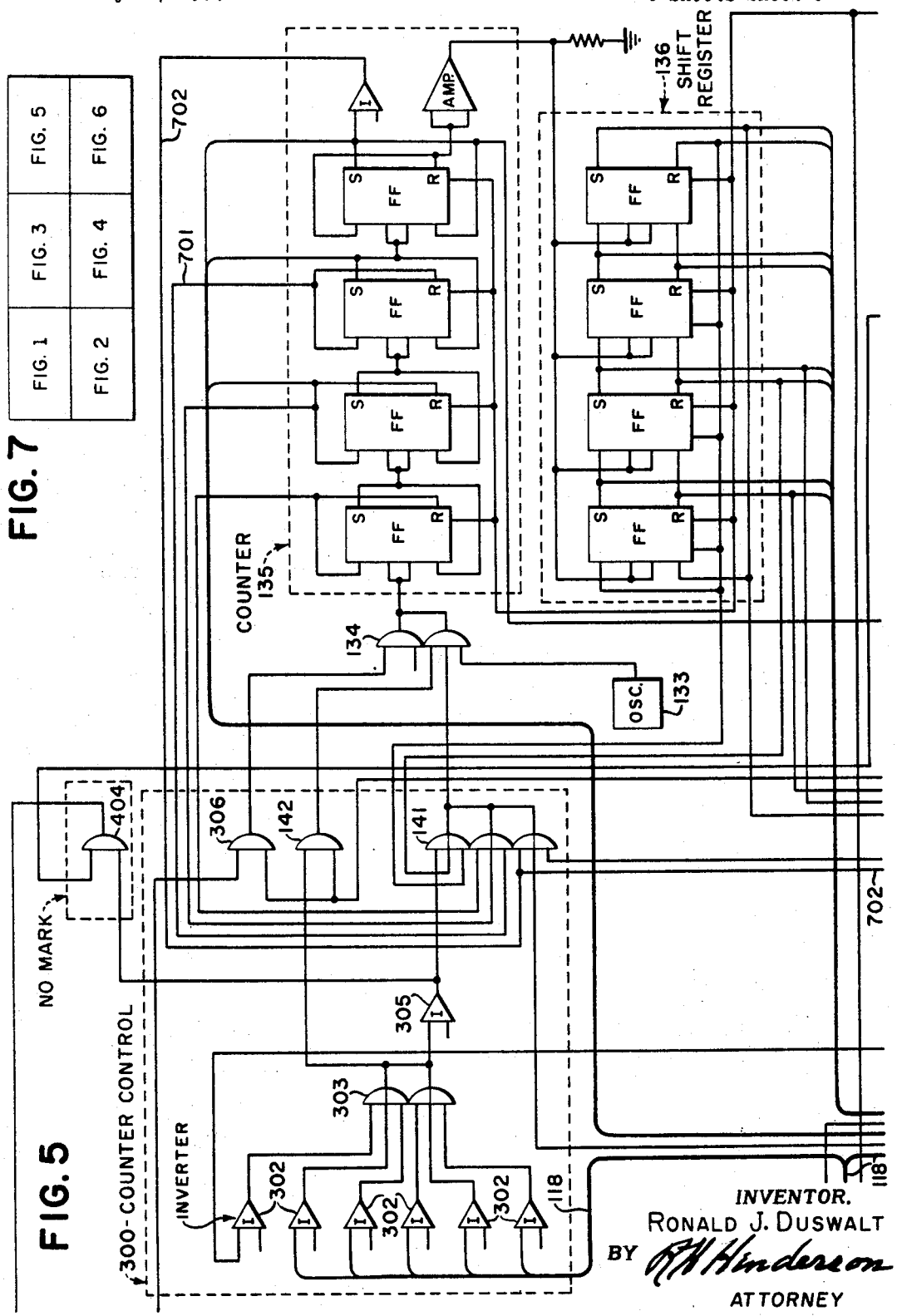

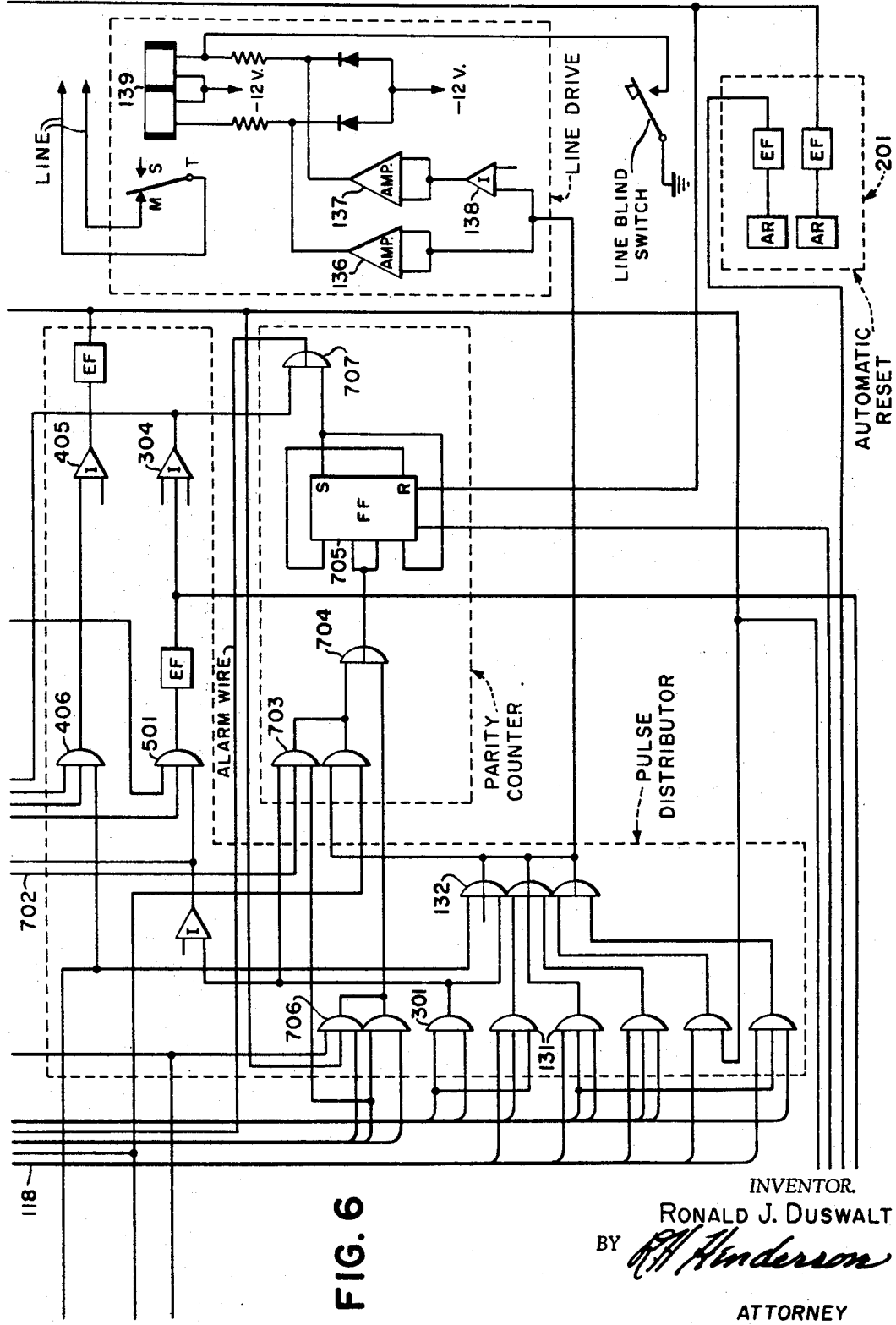

United States Patent Office 3,391,386
Patented July 2, 1968

3,391,386
CARD DATA TRANSMITTER CIRCUIT
Ronald J. Duswalt, Massapequa Park, N.Y., assignor to The Western Union Telegraph Company, New York, N.Y., a corporation of New York
Filed May 25, 1964, Ser. No. 369,892
1 Claim. (Cl. 340—146.1)

ABSTRACT OF THE DISCLOSURE

The disclosure describes a data transmitter for cards having columnar areas with preprinted function marks and other columnar areas with information marks applied by hand. The marks are electrically conductive. Three groups of brushes scan the columnar areas. Circuitry including the brushes converts the markings to parallel bit coded characters. A distributor senses the parallel bit characters and transmits them sequentially. Error detectors determine if a mark is omitted from any columnar area or if redundancy occurs in a columnar area. If any error occurs an alarm potential is generated and the distributor is stopped. If no error occurs generation of alarm potentials is prevented and the distributor continues transmission.

---

This invention relates to telegraph transmitters, and more particularly to the electrical circuits for such a device wherein cards having certain fixed and variable data inscribed thereon, may be caused to have their contents transmitted automatically over a telegraph line.

Circumstances are common when it is desirable to send messages comprising a relatively large amount of fixed information such as addressee's name and address, description of a particular class of goods, etc., combined with a relatively small amount of variable information such as quantity, price, and the like. In these circumstances, it is convenient to provide a quantity of prepared cards having the fixed information permanently inscribed thereon in the same Baudot code to be used for telegraph transmission, while the variable information, as a matter of necessity, must be applied to each card in alphanumeric form in order to be intelligible to the person who applies it by hand. This is usually done by punching or by marking the card with the electrically conductive mark of a suitable marker. The latter procedure is here preferred, and will be solely considered.

By segregating a marking field of the card into areas each corresponding to one of a sequence of fixed and predetermined alphanumeric and numeric characters, and making conductively pre-printed marks at selected points in those areas, the field of fixed information thus marked may be scanned with a plurality of electrical sensing brushes drawn simultaneously and uniformly across the card. Assuming energization of the marks by appropriate further conducting marks printed on the card, which are themselves energized by separate and appropriate electrified brushes, the group of sensing brushes will display successive groups of potentials corresponding to successive alphanumeric characters in a simultaneous coding which comprises a set of electrically distinguishable binary conditions on each of six conductors connected to the brushes.

Such conductors, being each connected to a separate bistable electronic circuit, will "set" the corresponding circuit only in the presence of a mark under its corresponding brush. The "set" and "reset" state of the circuits then comprise a storage medium in which the mark-space pattern of a numeric character is set up instantaneously in the Baudot code, and retained indefinitely in the condition of the bistable circuits, by the first energization of the sensing brushes.

By then scanning or interrogating the bistable circuits in sequence at an appropriate controlled rate, the binary serial sequence of a Baudot code transmission is obtained which is employed to actuate a transmitting relay on the telegraph line, after the application of appropriate safeguards against malfunction, as later described.

Letters and numbers comprising the variable information on the card accommodated by the invention appear on the card in the form of a plurality of columns of marking areas, each such marking area being either alphabetically identified, in the columns of figures, or numerically identified in the columns of numbers.

Further sensing brushes sweep these columns successively, there being one such brush for each such letter. In this case, however, the marking areas are unconnected by any conductive printing to the printed energization marks, and therefore these brushes all remain deenergized by an unmodified card.

When a conductive pencil mark has been applied to connect a column letter or figure area to its printed energization mark on the card, however, the corresponding single brush is energized. It therefore is important that in each such column only a single brush be marked-energized, and convenient that one certainly be energized, the latter to insure that marking of the column has not been overlooked. An extra marking area designated "omit" therefore is inserted in each column, together with a corresponding extra brush, and by this means it becomes possible to monitor the impulses received on the brushes to insure that one and only one energizing impulse is received from each column, any other result comprising an error, detectible by means later to be made clear.

Numeric "variable information" as marked on the card is detected by the same brushes used for the letters I, J, L, N, P, R, T, V, X and Z corresponding to the digits 0 to 9 respectively, but their sensing is preceded by the sensing of a fixedly printed carriage shift mark on the card, and followed by the sensing of an "unshift" mark after all digit columns have been sensed, in order to differentiate them from the letters.

Conductors from these sensing fingers lead to the logic elements comprising the code converter. This consists of "and" gates and "or" gates, connected in the manner shown, for deriving a simultaneous Baudot code representation of each alpha-numeric character sensed. The output thereof leads to a binary storage network where the Baudot pattern is preserved until and during the sequential scanning out or distribution process which produces the five serial binary "mark" and "space" impulses for transmission, whose permutations characterize each letter in the Baudot code.

In the case of numeric characters thus sensed, some should have an odd and some an even number of mark impulses in their code. Connected to the circuit of each such odd mark brush is provision for adding an extra mark, so that all such codes stored and scanned are even as to number of marks. After readout, these extra bits are deleted, but the evenness of the number of stored marks is first monitored, and comprises a parity check on the accuracy of pickup and of storage of numbers which is adequate to detect error and to prevent erroneous transmission.

In the case of letter characters, erroneous transmission is avoided firstly by insuring that one and only one character is read in each column, secondly, by circuitry monitoring the code converter and storage medium to insure that no simultaneous mark and space can be called for, and thirdly by providing means for preventing the transmission means from outrunning a too-slow pickup operation, all as later made clear.

It is therefore an object of the instant invention to provide means for transmitting both fixed and variable data automatically from a card, wherein both errors in the manual preparation of the card and errors in the automation translation of information from the card into the telegraph code are automatically detected and announced.

It is a further object of the present invention to provide means to convert a group of potentials, in simultaneous coding, into a serial code for teletypewriter-operating telegraph transmission by a compact and reliable electrical network.

It is another object of the invention to provide compact means for making said conversion while retaining the ability to transmit the serial coding of fixed information directly so inscribed on the same card.

Another object is to provide such conversion means having means for detecting and signalling plural markings of a card code character.

Another object is to provide in such a device, automatic means for the detection of imperfect code transmissions characterized by unpaired bits.

Another object is to provide in such a device, means for the detection of imperfect letter translations characterized by simultaneous mark and space signals.

Another object is to provide in such a device, simplified means for monitoring the accuracy of the transmission of figures.

Another object is to provide in such a device, means for sequence code mark storage, and means for sequence code space comparison therewith.

Another object is to provide in such conversion means, means to detect and signal an incorrect detection comprising a sequence of bits characterizing a non-existent character.

A further object is to provide means for preventing the plural transmission of a character, however slowly it may be scanned.

Another object is to provide a compact and trouble free code converter for converting to serial code and having no moving parts.

These and other objects which hereafter will become apparent, I achieve by the employment of an electrical circuit comprising primarily transistors and resistors, wherein the required functions of binary logic are performed by transistors which when quiescent are always in one of two stable states: either fully "on" or fully "off," with transitions between said states occurring within a negligible lapse of time. This is advantageous, because the dynamic characteristics of the particular transistor employed, then become of relatively minor importance, the criticality of their standards is much reduced, and the certainty of their correct operation thereby much improved.

A clearer understanding of the invention may be had by reference to the following detailed description of a specific illustrative example of a preferred embodiment thereof, when taken in connection with the drawings wherein:

FIGS. 1–6 are a schematic wiring diagram of the instant invention;

FIG. 7 is a diagram showing the arrangement of FIGS. 1–6.

Figure 1:
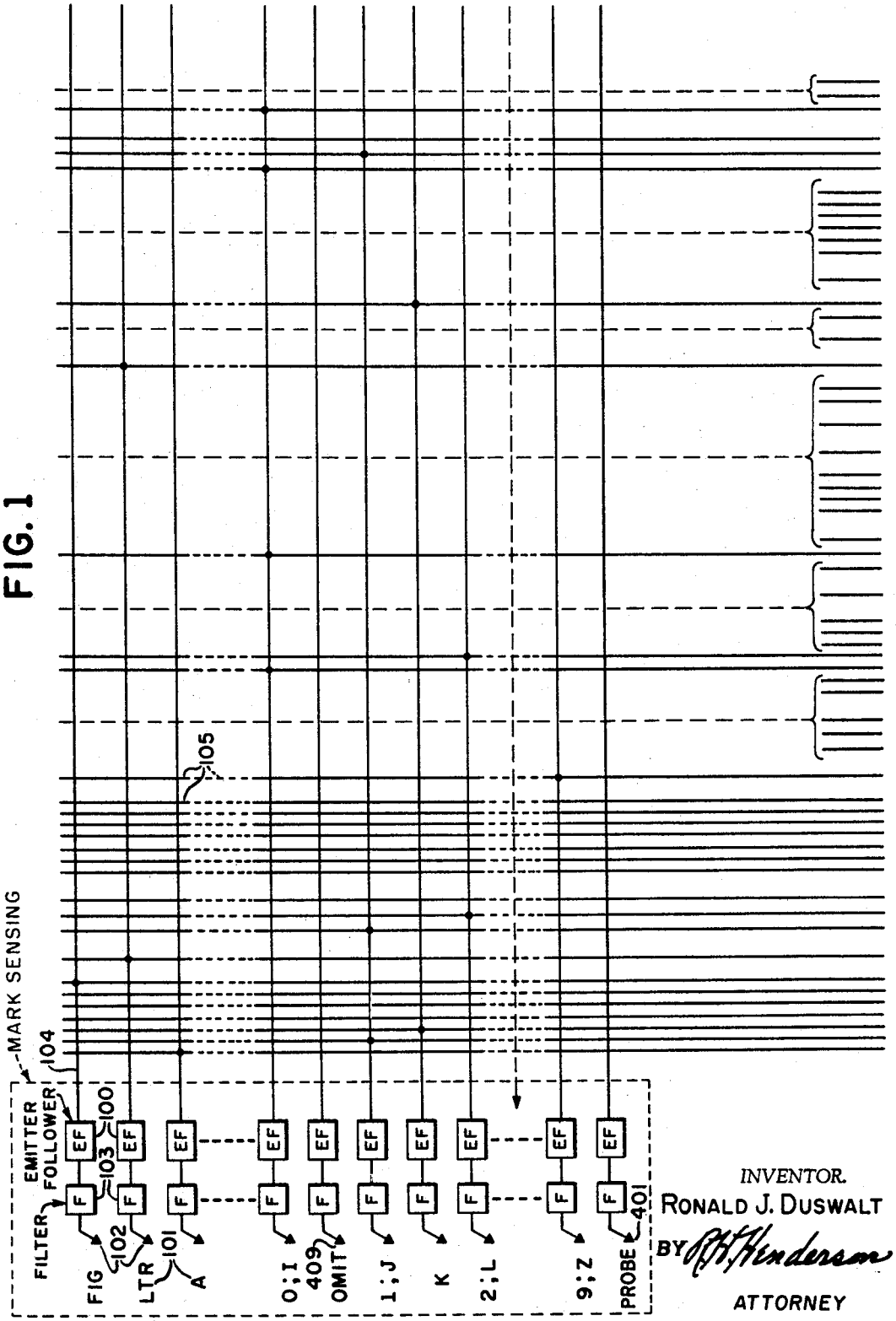
Figure 2:
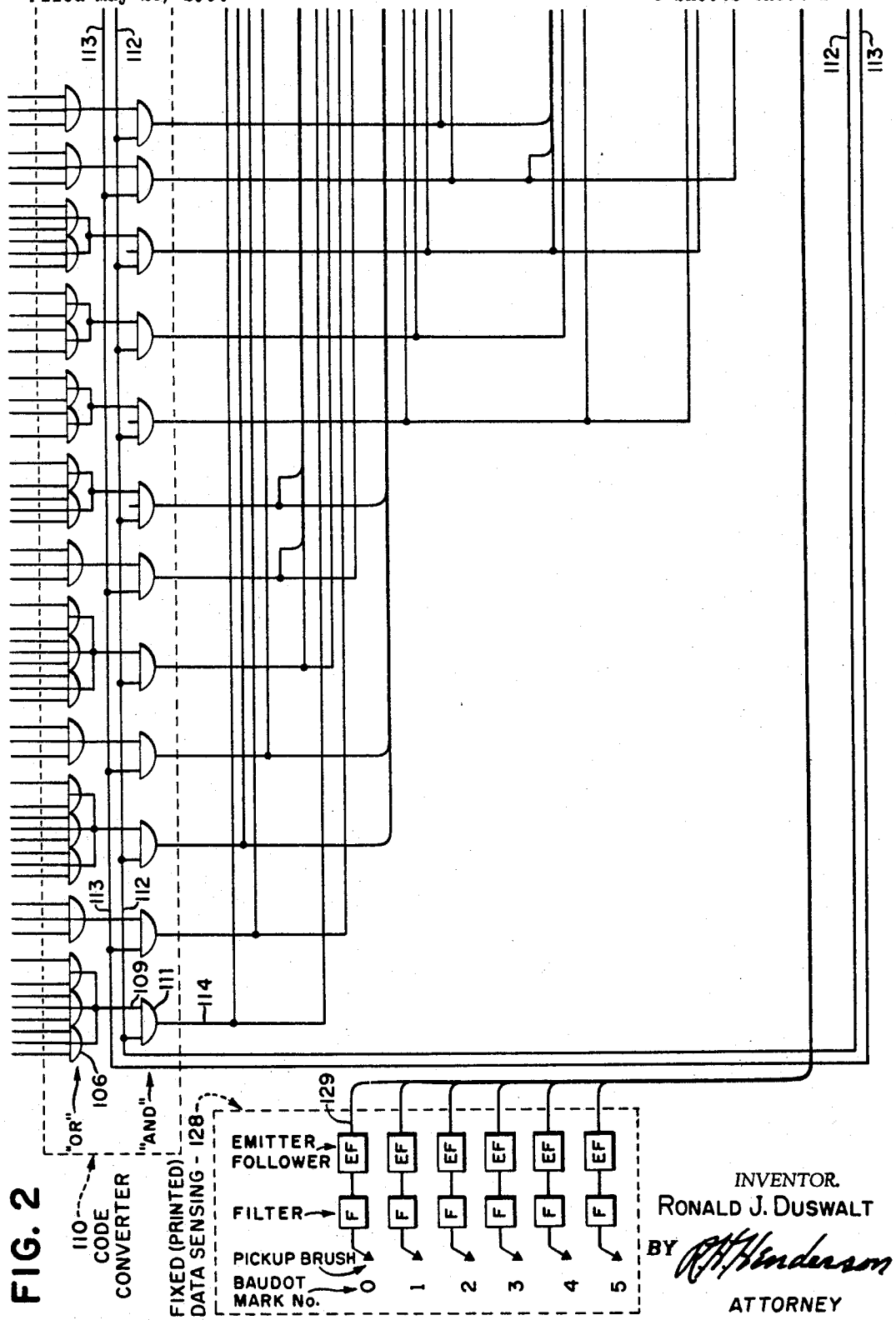
Figure 3:
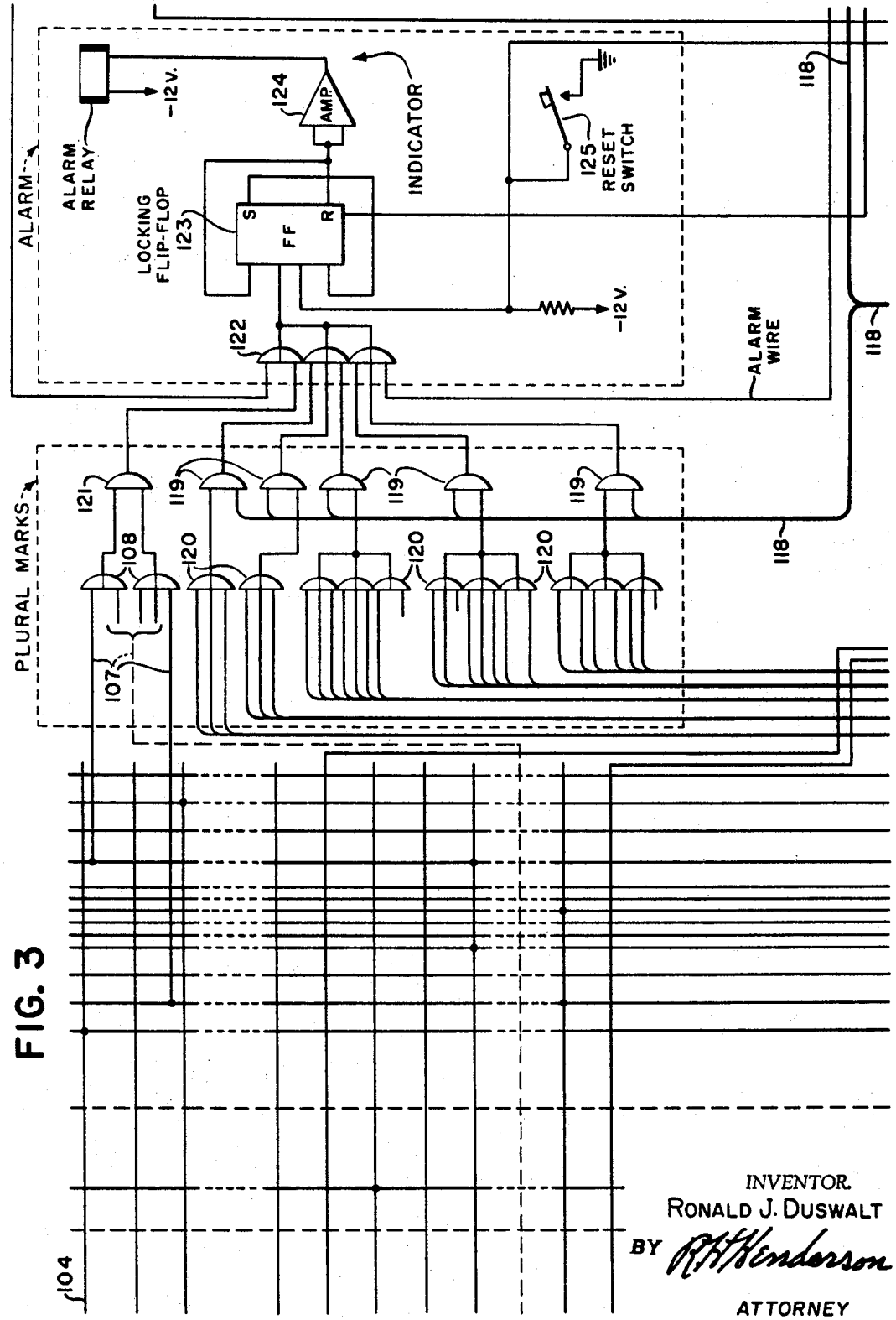
Figure 4:
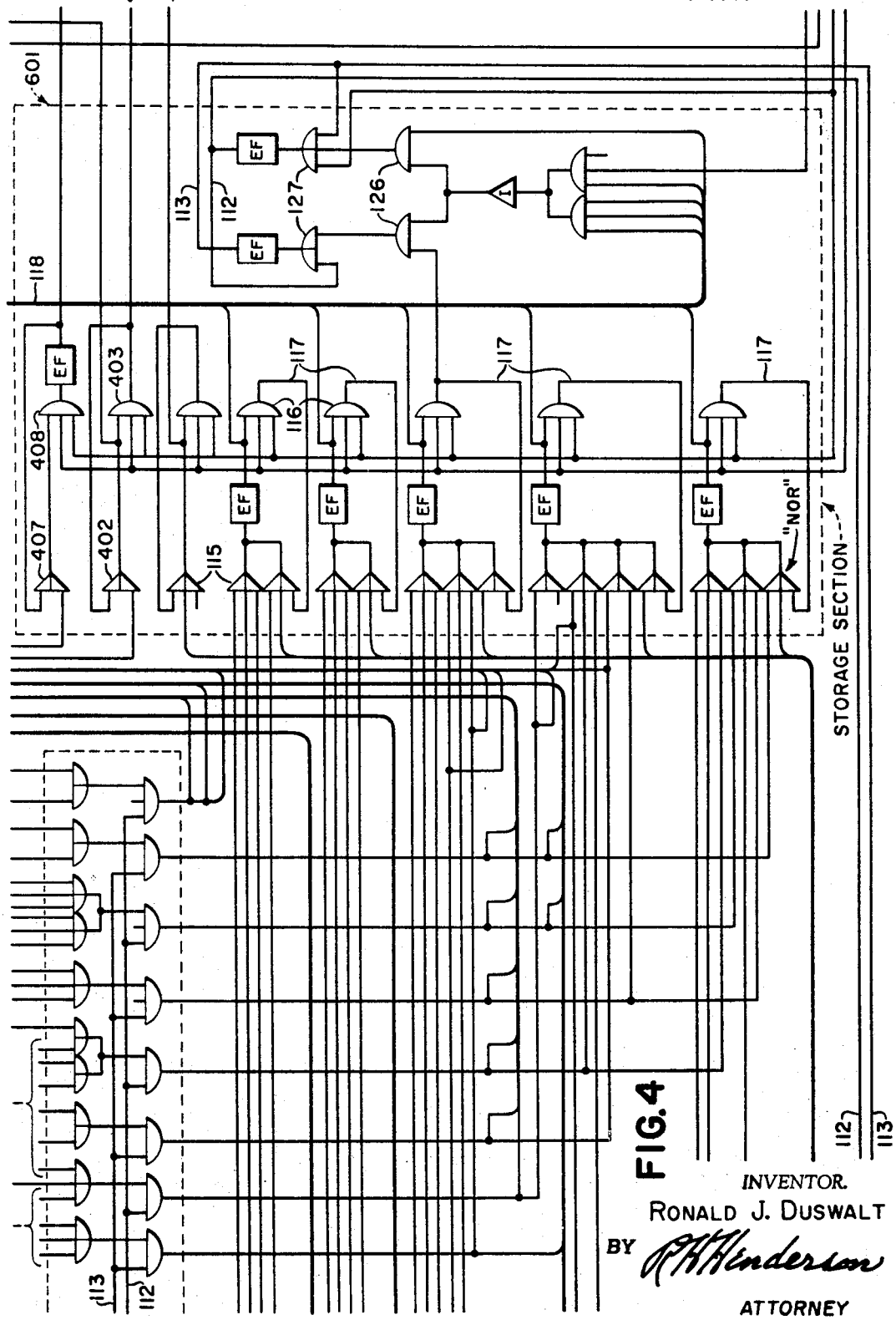

Turning now to the drawings, there is seen in FIG. 1 a column of designations 101 of the kind printed on a prepared data card of the type to be read by the instant invention, and which designate the areas of the card in which conductive marks are to be made in the event that a particular designation is desired to be transmitted from a given column of the card. All unique and several consecutive designations of a total of thirty are shown. Pickup brushes such as 102 slide over the moving card, and any such brush may encounter a conductive pencil mark on the card which is duly energized by overlying a printed line on the card, itself energized by means not shown.

Under this condition, brush 102 applies potential through a hash filter such as 103 to an emitter follower such as 100, whose output on wire 104 thereupon goes to unit negative output.

Wire 104 and corresponding successive wires are seen to extend horizontally across a field of vertical wires such as 105 leading to "or" gates such as 106 of the code converter 110. Similar wires such as 107 also extend across this field from the "or" gates 108 of the plural mark detector. Interconnections as required for the translation of alpha characters into a five unit simultaneous permutation code are indicated by dots at the intersections of the first mentioned horizontal and the vertical wires, some of which dots are shown, and all of which are uniquely determined by the particular code employed, and whose necessary location thus will be evident to the skilled designer of digital circuitry. Wires 107, of course, are similarly connected by uniquely necessary dots not shown to the appropriate vertical wires 105 for purposes later described.

"Or" gates 106 have the known property of responding to an input potential on any one or more of the plural inputs connected thereto (at the top or left-hand side, on the drawings), by providing a predetermined one of two available output potentials on an output wire. In the instant arrangement, an output at ground potential results from the application of input signal to any input wire or wires. This output signal on wires such as 109 enter "and" gates such as 111, together with signals on wires 112 and 113 from the "Figures-Letters" storage section later described. Such "and" gates differ from the "or" gates described, only in having their significant or energized output at the other of the two available output potentials, whereby an output occurs on a wire 114 only when every input of a gate 111 is energized.

Such wires 114 constitute a second field of vertical wires, similarly interconnected to horizontal wires entering "or" gates 115.

"Or" gates 115 are seen to be connected by feedback wires 117 to the outputs of their following "and" gates 116, so that when once triggered, they are locked in that condition until specially released, and thus constitute a storage unit for the marking pulses of the Baudot code. This therefore constitutes an array of locking trigger circuits, which are simultaneously and instantaneously set up in appropriate code pattern upon the first energization of any pickup brush 102. Since the motion of the card under the brush is relatively slow, this pattern is uninterrupted during an interval sufficient for serial readout of the condition of each trigger circuit and transmission of this information while being guarded against further marks, or the omission of any mark, by further circuitry.

*Plural mark detection*

When a card column has been inscribed with more than one mark, this constitutes an ambiguity which the invention will detect in the following manner. Each conductive character mark is productive of a predetermined pattern of serial mark and space potentials in the storage section 601, as before described. Each such mark having a distinct pattern in the five-unit Baudot code, plural marks read simultaneously, or before resetting of the section 601, will necessarily call for incompatible simultaneous mark and space potentials in one or more of these five units. Such a call is detected in the following manner.

The presence of any "mark" storage in gates 115–116 energizes a wire of cable 118 to provide one input to each of five "and" gates such as 119. Any further extraneous input to any one of them during this condition from the "or" gates 120 or from the "or" gates 108, through the "and" gate 121 as brought about by reading a "spacing" command in the same pulse period will trigger "or" gate 122 to actuate self locking flip-flop 123 to the "on" condition for energizing an indicator 124 which can be turned off only by the manual depression of the reset key 125. The stored character thus is guarded against the intrusion of extraneous marks.

In addition to the guarding of all stored alpha characters in the above-described manner, the majority of numeric characters are similarly guarded by this pulse comparison method. It has been found, however, that considerable circuit simplification can be effected by guarding against the simultaneous marking of 2 and 5, 3 and 6, and 3 and 9, by other means The two gates 108 have inputs normally not simultaneously energized for the two gates by the pickup of any single number mark on their connected brushes 102. Occurrence of any of the mentioned plural number marks, however, results in energized output from both of the gates 108 into "and" gate 121, initiating an alarm through gate 122 as before described.

Since the designations 101 include, in some instances, upper and lower case characters such as 2;L, it is necessary to distinguish between the meanings desired for a mark of such designation in a column. This is accomplished by pickup from the last pencil-marked "Fig." or "LTR" designation area in any preceding column. Such pickup, translated in the manner described, causes operation of the appropriate "and" gate 126 and locking of the flip-flop 127 to energize wire 112 or 113 respectively for arming or locking up one set of the "and" gates 111 in the case of "Figures" and the alternate set as shown, in the case of "Letters."

All of the logic modules thus far described and to be described, with the exception of gates 126 and 127, are arranged in well known manner to be reset to their initial or logic zero condition by a potential applied at the conclusion of the transmission of each character. The excepted gates, however, are triggered only by detection of such "Fig." or "LTR" marking as differs from the last detected.

A further pickup brush, filter and emitter follower assembly 128 operates in a manner similar to that of 101, 102 and 103 described, to sense conductive marks pre-printed on a separate area of the card.

Since these markings are made in the Baudot code, rather than in alphanumeric characters, the simultaneous outputs are led directly to the gates 115 for storage, no translation in the code converter 110 being required. An extra output wire 129, however, applies the output of a zero mark reading brush to storage. When the card being read has a zero mark printed with each code character that requires an odd number of marks in its code, the total number of marks detected, and hence the number of energized storage sections 115, is always even in number. This provides a basis for the later described parity check.

Conductors of the cable 118 connected to the Baudot storage gates 115 lead to "and" gates such as 131 of the distributor. If pulsed sequentially at the remaining inputs of each "and" gate, the desired serial permutation code output would be delivered to "or" gate 132 by the distributor. A more convenient arrangement is employed, however, in which an oscillator 133, through "or" gate 134, operates the conventional binary countdown chain 135 to act as a clock connected to the shift register 136.

*Distributor*

The potentials associated with each of the elements of countdown chain 135 and of shift register 136 comprise a series of rectangular waves having graduated periods and time displaced origin so that when appropriate ones of those potentials are applied to the several inputs of an "and" gate, their coincidence comprises a rectangular clock pulse to the gate, which is uniquely timed to a desired marking period of the Baudot code, as determined by the particular connections made from each "and" gate to the counter 135 and shift register 136.

Such connections made to the gates 131 of the distributor, the connections being appropriately permuted for the several gates in well known manner by circuitry not shown, cause those gates connected to stored marks to fire in sequence into gate 132 without other need for serial commutation.

*Line driver*

Amplifier 136 is driven thereby, as well as amplifier 137 through the inverter 138, in push-pull fashion, to operate the relay 139 on the telegraph line.

*Counter control*

The counter comprising chain 135 and shift register 136 is timed by a continuously running oscillator 133 through a gate 134 which normally is closed to the passage of pulses from the oscillator, but opens as required to provide timed driving pulses from the counter for the serial transmission of information bits sensed and stored, in the following manner.

Stored information results in output potential on one or more of the wires 117 of the storage circuits which enter the inverters 302 through the cable 118, and passes to the gate 303 through the inverter 305, through gate 141 to open gate 134, allowing the oscillator 133 pulses to pass into the counter for signal readout.

A further gate 142 responds to the combined presence of a rest pulse under transmission from inverter 304 and the stored response to a probe pulse applied to the sensing brushes early in each bit cycle to detect the presence of any mark. If, during the first quarter portion of any rest pulse period, there still remains character information to be sent, as detected by the above arrangement, it is indicative of a mechanical card feed so slow that a transmitted character is about to be transmitted a second time. Gate 142 then is effective to close gate 134, stopping the counter, and all further transmission, until such time as all stored information has been disposed of.

*Automatic reset circuit*

Stored information is cleared from the storage section as the sensing brushes move off the marked character, because gate 501, energized by simultaneous presence of a rest pulse signal from gate 301 and the first quarter of the rest pulse period as determined by its connection to the counter 135, energizes its output to clear the storage section by energizing the reset side of the storage members 116.

*Rest pulses*

A rest pulse is required to be transmitted as a part of each character of the Baudot code. This is generated in the "and" gate 301, which is actuated only by the simultaneous occurrence of zero signal from the first and third flip-flop of the counter chain of units 136, whereby 301 is driven to unit output, thus actuating "or" gate 132 to generate a marking pulse at the appropriate time, as required.

*No mark protection*

If a transverse card column of alpha-numeric information has been inadequately marked, or has not been marked at all, either with a desired character, or an "omit" mark, this constitutes a defect detectable by the invention in the following manner. Scanning of the card column by the sensing brushes 102 detects no mark, but the probe sensing brush 401 does encounter a fixedly pre-printed mark on the card for that column, and a probe pulse function, indicated by the potential picked up from the card by the brush 401 is seen to enter and set the storage assembly comprising gates 402 and 403 in a manner similar to that of a detected character mark being stored in the gates 115 and 116 as previously described. This is seen to trigger "or" gate 141 of the counter control mechanism to start the counter 135. Since no detected character mark actually is stored, however, the "or" gate 303 of the counter control is deactivated, and inverter 305 applies a signal to "and" gate 404 of the alarm circuit.

The other signal required to activate gate 404 is the presence of a signal from inverter 405 as provided by the absence of an "omit" mark storage signal at fourth pulse occurrence time into gate 406, out of storage by gates 407 and 408 as brought about by the detection of no signal at brush 409. Output from gate 404 due to no mark in a column thus is seen to actuate gate 122 to indicate an alarm as before mentioned.

*Parity check*

Accuracy of the detection of fixed information is effected by means of a parity count of the marking pulses detected. Since the inscription of this information is predetermined and pre-applied, it is convenient to provide a separate marking area on the card and a separate pickup brush therefor connected to the wire 129, so that the number of "mark" pulses in such a column may always be kept even, by preinserting an inscription in the said separate area as needed.

Gate 132 output is zero during marking pulse transmission. Wires 701 and 702 of counter 135 define the third quarter portion of each unit pulse length by simultaneous zero potential output. Gate 403 has zero output when no probe pulse function is in storage. Gate 301 has zero output during active (nonrest-portion) pulse time. Coincidence of these events drives "and" gate 503 to operate "or" gate 704 to change the state of flip-flop 709. Gate 706, having inputs connected to zero pulse storage and appropriate clock timing for the first quarter portion of the fourth pulse period, is similarly connected to flip-flop 705. As a "self-steering" flip-flop, 705 provides output or not, according to the number of times it has been actuated, and thus provides output to gate 707 upon an odd count of marking-plus-zero pulses. If such potential remains at the conclusion of character transmission as defined by rest period potential from gate 501 into "and" gate 707, this provides an output potential therefrom into gate 122 to initiate an alarm.

Although this invention has been described with reference to a specific illustrative example thereof, it will be understood that various modifications, elaborations and alterations will occur to those skilled in the art, which do not, however, depart from the essential spirit of the invention, and it therefore is intended the invention shall be limited only by the appended claim.

What is claimed is:

1. In an electrical mark sensing and code sending transmitter for automatically reading electrically conductive information signal marks and function signal marks located in different predetermined columnar areas on a substantially non-conductive card, said function signal marks being preinscribed on said card and said information marks being manually inscribed thereon, the combination comprising:

(a) first brush means located for sensing marks on said card in first columnar areas assigned to certain of said information signal marks;

(b) second brush means located for sensing marks on said card in second columnar areas assigned to said function signal marks;

(c) third brush means located for sensing other marks on said card in third columnar areas in the event a mark is absent from any one of the first and second columnar areas;

(d) means for applying potentials to each of said brush means;

(e) code converter means comprising a plurality of first logic gate means having inputs and outputs, said inputs being connected to said first brush means and operable by potentials thereat to provide at the outputs of the first logic gate means a plurality of simultaneous output potentials representing corresponding bits of parallel bit coded characters;

(f) code storage means having inputs connected to the outputs of the first logic gate means and to the second brush means, said code storage means comprising:

(1) a plurality of bistable electronic storage members each actuatable into a storage state characterized by a first electrical output potential representing retenion of a coded mark, and each actuatable into a rest state characterized by a second electrical output potential representing coded information signals;

(g) distributor means connected to said code storage means and arranged for sequential transmission bit-by-bit of stored information code signals represented by said first electrical potential of the bistable electronic storage members;

(h) clock means connected to said distributor means for timing the sequence of code signals transmitted by the distributor means;

(i) plural mark detector means comprising a plurality of second logic gate means having inputs connected to said code converter means and said first brush means and arranged to produce a first alarm signal output potential when said first brush means senses more than one mark at a time;

(j) second mark detector means comprising third logic gate means connected to said code storage means and said clock means and arranged to produce a second alarm signal output potential in the event said first electrical output potential fails to occur at the code storage means at a predetermined instant in said timed sequence;

(k) circuit means interconnecting said third brush means, said distributor means, and said plural mark detector means to permit the distributor means to transmit stored information code signals sequentially bit-by-bit and to prevent production of said first alarm signal output potential only when each columnar area sensed by the first and second brush means contains one and only one inscribed mark; and (l) circuit means interconnecting said second mark detector means and said distributor means to permit the distributor means to transmit stored information code signals and to prevent production of said second alarm signal output potential only when a predetermined number of marks corresponding to each coded character is transmitted.

References Cited

UNITED STATES PATENTS

| | | | |
|---|---|---|---|
| 2,888,050 | 8/1954 | Harris | 340—146.1 |
| 2,993,956 | 7/1961 | Steeneck | 340—146.1 |
| 3,002,681 | 10/1961 | Norton et al. | |
| 3,021,059 | 2/1962 | Hammer et al. | |
| 3,124,783 | 3/1964 | Adams | 340—146.1 |
| 3,142,829 | 7/1964 | Comstock | 340—146.1 |
| 3,267,258 | 8/1966 | Bene | 235—61.7 |
| 3,278,897 | 10/1966 | Ashby et al. | 340—146.1 |
| 3,284,771 | 11/1966 | Bochmann et al. | 340—146.1 |
| 3,303,463 | 2/1967 | Hamburgen | 340—146.1 |
| 3,311,878 | 3/1967 | Melas | 340—146.1 |

MALCOLM A. MORRISON, *Primary Examiner.*

K. F. MILDE, C. E. ATKINSON, *Assistant Examiners.*